(12) United States Patent
Zhu et al.

(10) Patent No.: US 12,003,444 B2
(45) Date of Patent: Jun. 4, 2024

(54) DETERMINING RESOURCES FOR PHASE TRACKING REFERENCE SIGNALS

(71) Applicant: LENOVO (BEIJING) LIMITED, Beijing (CN)

(72) Inventors: Chenxi Zhu, Beijing (CN); Bingchao Liu, Beijing (CN); Wei Ling, Beijing (CN); LingLing Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 405 days.

(21) Appl. No.: 17/423,562

(22) PCT Filed: Jan. 18, 2019

(86) PCT No.: PCT/CN2019/072401
§ 371 (c)(1),
(2) Date: Jul. 16, 2021

(87) PCT Pub. No.: WO2020/147123
PCT Pub. Date: Jul. 23, 2020

(65) Prior Publication Data
US 2022/0116170 A1    Apr. 14, 2022

(51) Int. Cl.
*H04L 5/00* (2006.01)
(52) U.S. Cl.
CPC .................. *H04L 5/0048* (2013.01)
(58) Field of Classification Search
None
See application file for complete search history.

(56) References Cited

U.S. PATENT DOCUMENTS

2020/0084788 A1* 3/2020 Li ................ H04L 5/0053
2021/0203464 A1* 7/2021 Ren ............... H04L 5/0057

FOREIGN PATENT DOCUMENTS

CA    3049490 A1 *  7/2018   ........... H04B 17/373
CA    3047351 A1 *  5/2019   ....... H04L 25/03159
(Continued)

OTHER PUBLICATIONS

International Searching Authority, "Written Opinion of the International Searching Authority," PCT/CN2019/072401, dated Jun. 24, 2019, pp. 1-4.

(Continued)

*Primary Examiner* — Ajit Patel
(74) *Attorney, Agent, or Firm* — Kunzler Bean & Adamson

(57) ABSTRACT

Apparatuses, methods, and systems are disclosed for determining resources for phase tracking reference signals. One method (500) includes determining (502) a first set of resources. The first set of resources are used for non-zero power phase tracking reference signals for a first downlink transmission and zero power phase tracking reference signals for a second downlink transmission. The method (500) includes determining (504) a second set of resources. The second set of resources are used for zero power phase tracking reference signals for the first downlink transmission and non-zero power phase tracking reference signals for the second downlink transmission. The method (500) includes transmitting (506) the first downlink transmission using the first set of resources and the second set of resources. The first downlink transmission is transmitted concurrently with the second downlink transmission.

20 Claims, 6 Drawing Sheets

(56) References Cited

FOREIGN PATENT DOCUMENTS

| CA | 3062381 A1 | * | 11/2019 | ........... H04L 1/0003 |
|---|---|---|---|---|
| CA | 3030799 A1 | * | 6/2020 | ........... H04B 7/0456 |
| CN | 108631987 A | | 10/2018 | |
| EP | 3955655 A1 | * | 2/2022 | ........... H04L 5/0044 |
| WO | WO-2017134943 A1 | * | 8/2017 | ........... H04L 5/0044 |
| WO | 2018044715 A1 | | 3/2018 | |
| WO | 2018174578 A1 | | 9/2018 | |

OTHER PUBLICATIONS

Panasonic, PT-RS design, 3GPP TSG-RAN WG1 Meeting NR Ad-Hoc #2, R1-1710359, Jun. 27-30, 2017, pp. 1-7, Qingdao, China.
Ericsson, On DL PTRS design, 3GPP TSG-RAN WG1 #89ah-NR, R1-1711047, Jun. 27-30, 2017, pp. 1-9, Qingdao, China.
ZTE, Discussion on RS for phase tracking, 3GPP TSG RAN WG1 Meeting #89, R1-1707132, May 14-19, 2017, pp. 1-11, Hangzhou, China.

\* cited by examiner

DETERMINING RESOURCES FOR PHASE TRACKING REFERENCE SIGNALS

FIELD

The subject matter disclosed herein relates generally to wireless communications and more particularly relates to determining resources for phase tracking reference signals.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast to ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Plane ("CP"), CSI-RS Resource Indicator ("CRI"), Cell RNTI ("C-RNTI"), Channel State Information ("CSI"), Channel Quality Indicator ("CQI"), Central Unit ("CU"), Codeword ("CW"), Downlink ("DL"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Modulation Coding Scheme ("MCS"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Quasi Co-Located ("QCL"), Quality of Service ("QoS"), Random Access Channel ("RACH"), Radio Access Network ("RAN"), Radio Access Technology ("RAT"), Resource Element ("RE"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), Synchronization Signal ("SS"), SS/PBCH Block ("SSB"), Time Division Duplex ("TDD"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), and Zero Power ("ZP"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, phase tracking reference signals may be used. In such networks, resources for the phase tracking reference signals may overlap between different TRPs.

BRIEF SUMMARY

Methods for determining resources for phase tracking reference signals are disclosed. Apparatuses and systems also perform the functions of the apparatus. In one embodiment, the method includes determining a first set of resources. In such an embodiment, the first set of resources are used for non-zero power phase tracking reference signals for a first downlink transmission and zero power phase tracking reference signals for a second downlink transmission. In certain embodiments, the method includes determining a second set of resources. In such embodiments, the second set of resources are used for zero power phase tracking reference signals for the first downlink transmission and non-zero power phase tracking reference signals for the second downlink transmission. In various embodiments, the method includes transmitting the first downlink transmission using the first set of resources and the second set of resources. In such embodiments, the first downlink transmission is transmitted concurrently with the second downlink transmission.

An apparatus for determining resources for phase tracking reference signals, in one embodiment, includes a processor that: determines a first set of resources, wherein the first set of resources are used for non-zero power phase tracking reference signals for a first downlink transmission and zero power phase tracking reference signals for a second downlink transmission; and determines a second set of resources, wherein the second set of resources are used for zero power phase tracking reference signals for the first downlink transmission and non-zero power phase tracking reference signals for the second downlink transmission. In various embodiments, the apparatus includes a transmitter that transmits the first downlink transmission using the first set of resources and the second set of resources. In such embodiments, the first downlink transmission is transmitted concurrently with the second downlink transmission.

In one embodiment, a method for determining resources for phase tracking reference signals includes receiving a first downlink transmission using a first set of resources and a second set of resources. In certain embodiments, the method includes receiving a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

An apparatus for determining resources for phase tracking reference signals, in one embodiment, includes a receiver that: receives a first downlink transmission using a first set of resources and a second set of resources; and receives a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
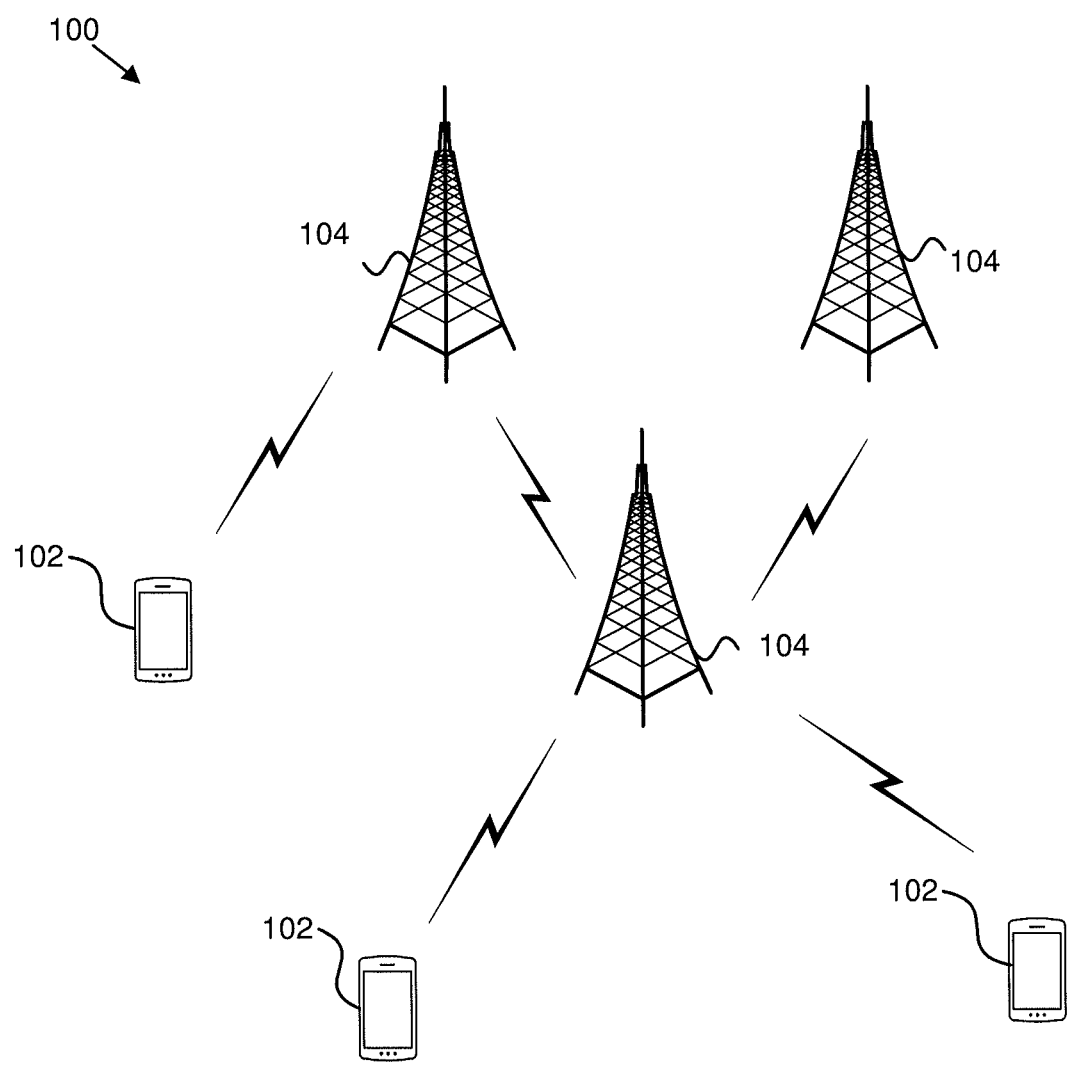
FIG. 1 is a schematic block diagram illustrating one embodiment of a wireless communication system for determining resources for phase tracking reference signals.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining resources for phase tracking reference signals. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may determine a first set of resources. In such embodiments, the first set of resources are used for non-zero power phase tracking reference signals for a first downlink transmission and zero power phase tracking reference signals for a second downlink transmission. In certain embodiments, the network unit 104 may determine a second set of resources. In such embodiments, the second set of resources are used for zero power phase tracking reference signals for the first downlink transmission and non-zero power phase tracking reference signals for the second downlink transmission. In various embodiments, the network unit 104 may transmit the first downlink transmission using the first set of resources and the second set of resources. In such embodiments, the first downlink transmission is transmitted concurrently with the second downlink transmission. Accordingly, a network unit 104 may be used for determining resources for phase tracking reference signals. As used herein, resources may refer to time resources and/or frequency resources.

In various embodiments, a remote unit 102 may receive a first downlink transmission using a first set of resources and a second set of resources. In certain embodiments, the remote unit 102 may receive a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission. Accordingly, a remote unit 102 may be used for determining resources for phase tracking reference signals.

Figure 2:
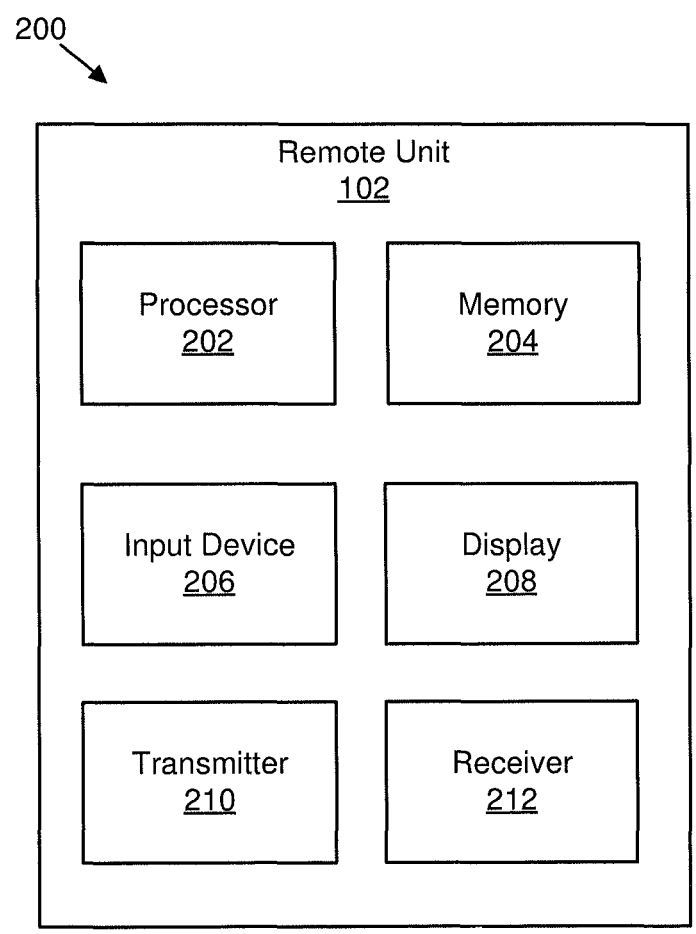
FIG. 2 is a schematic block diagram illustrating one embodiment of an apparatus that may be used for determining resources for phase tracking reference signals.

FIG. 2 depicts one embodiment of an apparatus 200 that may be used for determining resources for phase tracking reference signals. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212: receives a first downlink transmission using a first set of resources and a second set of resources; and receives a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
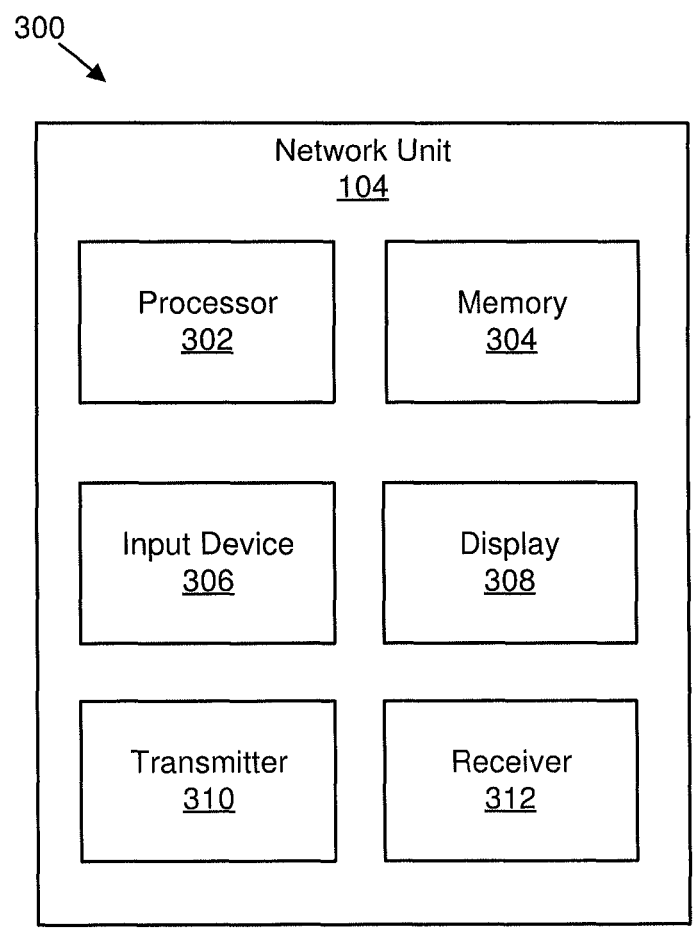
FIG. 3 is a schematic block diagram illustrating one embodiment of an apparatus that may be used for determining resources for phase tracking reference signals.

FIG. 3 depicts one embodiment of an apparatus 300 that may be used for determining resources for phase tracking reference signals. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the processor 302: determines a first set of resources, wherein the first set of resources are used for non-zero power phase tracking reference signals for a first downlink transmission and zero power phase tracking reference signals for a second downlink transmission; and determines a second set of resources, wherein the second set of resources are used for zero power phase tracking reference signals for the first downlink transmission and non-zero power phase tracking reference signals for the second downlink transmission. In various embodiments, the transmitter 310 transmits the first downlink transmission using the first set of resources and the second set of resources. In such embodiments, the first downlink transmission is transmitted concurrently with the second downlink transmission. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, such as NR release 15, PTRS may be used in PDSCH and PUSCH channels for a receiver to estimate a phase noise of a transmitted signal. In some embodiments, there may be one PTRS port for PDSCH, and up to two PTRS ports for PUSCH. In such embodiments, the density of the PTRS in a frequency domain may depend on a scheduled bandwidth of the PDSCH and/or PUSCH, while a position of the PTRS in the frequency domain may depend on a scheduled remote unit 102 (e.g., UE) $n_{RNTI}$, associated DMRS port, DMRS configuration and/or RRC parameter (e.g., resourceElementOffset). Moreover, in such embodiments, in a time domain a density of symbols containing PTRS may depend on a scheduled MCS and RRC configured threshold as well as symbols containing DMRS. In some embodiments, REs containing PTRS may not be used for data, so PDSCH and PUSCH data may be rate-matched around PTRS. In certain embodiments, both RRC configuration and PDCCH DCI (e.g., format 0_1 or format 1_1) may be used for a remote unit 102 to determine a location at which PTRS are transmitted. In some embodiments, the same precoding of a DMRS may be applied to a corresponding PTRS port. In various embodiments, RE mapping of PTRS may be specified in 38.211 (e.g., 38.211 V15.3.0, section 7.4.1.2.2 "Mapping to physical resources") as follows:

The UE shall assume phase-tracking reference signals being present only in the resource blocks used for the PDSCH, and only if the procedure in [6, TS 38.214] indicates phase-tracking reference signals being used. If present, the UE shall assume the PDSCH PT-RS is scaled by a factor $\beta_{PT-RS,i}$ to conform with the transmission power specified in clause 4.1 of [6, TS 38.214] and mapped to resource elements $(k, 1)_{p,\mu}$ according to $a_{k,l}^{(p,\mu)} = \beta_{PT-RS,i} r_k$ when all the following conditions are fulfilled: l is within the OFDM symbols allocated for the PDSCH transmission; and resource element $(k, 1)_{p,\mu}$ is not used for DM-RS, non-zero-power CSI-RS not configured for mobility measurements, zero-power CSI-RS, SS/PBCH block, a detected PDCCH, or is declared as 'not available' by clause 5.1.4.1 of [6, TS 38.214].

The set of time indices/defined relative to the start of the PDSCH allocation is defined by: 1. set i=0 and $l_{ref}$=0; 2. if any symbol in the interval max $(l_{ref}+(i-1)L_{PT-RS}+1, lref, \ldots, lref+iLPT-RS$ overlaps with a symbol used for DM-RS according to clause 7.4.1.1.2, set i=1, set $l_{ref}$ to the symbol index of the DM-RS symbol in case of a single-symbol DM-RS and to the symbol index of the second DM-RS symbol in case of a double-symbol DM-RS, repeat from step 2 as long as $l_{ref}+iL_{PT-RS}$ is inside the PDSCH allocation; 3. add $l_{ref}+iL_{PT-RS}$ to the set of time indices for PT-RS; 4. increment i by one; 5. repeat from step 2 above as long as $l_{ref}+iL_{PT-RS}$ is inside the PDSCH allocation, where $L_{PT-RS} \in \{1, 2, 4\}$.

For the purpose of PT-RS mapping, the resource blocks allocated for PDSCH transmission are numbered from 0 to $N_{RB}-1$ from the lowest scheduled resource block to the highest. The corresponding subcarriers in this set of resource blocks are numbered in increasing order starting from the lowest frequency from 0 to $N_{sc}^{RB}N_{RB}-1$. The subcarriers to which the UE shall assume the PT-RS is mapped are given by $$k = k_{ref}^{RE} + (iK_{PT-RS} + k_{ref}^{RB})N_{sc}^{RB}$$

$$k_{ref}^{RB} = \begin{cases} n_{RNTI} \bmod K_{PT-RS} & \text{if } N_{RB} \bmod K_{PT-RS} = 0 \\ n_{RNTI} \bmod (N_{RB} \bmod K_{PT-RS}) & \text{otherwise} \end{cases}$$

where i=0, 1, 2, . . . , $k_{ref}^{RE}$ is given by Table 7.4.1.2.2-1 for the DM-RS port associated with the PT-RS port according to clause 5.1.6.2 in [6, TS 38.214] (if the higher-layer parameter resourceElementOffset in the PTRS-DownlinkConfig IE is not configured, the column corresponding to '00' shall be used), $n_{RNTI}$ is the RNTI associated with the DCI scheduling the transmission, $N_{RB}$ is the number of resource blocks scheduled, and $K_{PT-RS} \in \{2, 4\}$ is given by [6, TS 38.214].

TABLE 7.4.1.2.2-1

The parameter $k_{ref}^{RE}$.

| DM-RS antenna port p | DM-RS Configuration type 1 resourceElementOffset | | | | DM-RS Configuration type 2 resourceElementOffset | | | |
|---|---|---|---|---|---|---|---|---|
| | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

In some embodiments, if a backhaul connecting multiple TRPs is non-ideal, a delay between the TRPs may be as much as 20 ms or longer. As may be appreciated, this delay may inhibit two TRPs from dynamically coordinating their DL transmissions; however, two TRPs may be able to coordinate RRC configurations. In such embodiments, even with some coordinated RRC configurations, the two TRPs may need to schedule respective PDSCH transmissions independently. Therefore, each TRP may schedule its PDSCH without knowledge of DCI of the other TRPs scheduling another PDSCH. In various embodiments, to have good performance of phase estimation from a PTRS, REs occupied by PTRS may not be used for data in any PDSCH. In certain embodiments, it may not be possible for one PDSCH to rate match around REs occupied by PTRS of another PDSCH without sharing a scheduling DCI format 0_1 between the TRPs because the PTRS REs depend on the DCI format 0_1. However, as may be appreciated, it may not be possible to have detailed scheduling information per slot (or per mini-slot) in a non-ideal backhaul system.

Figure 4:
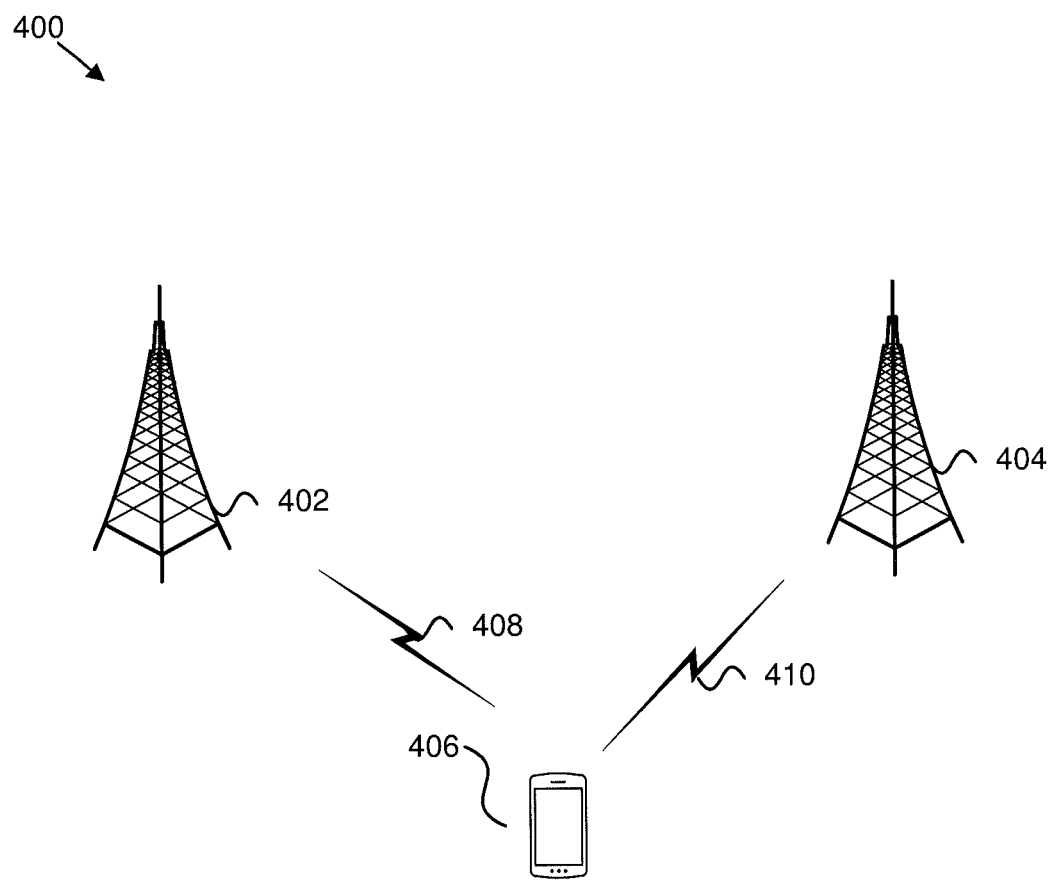
FIG. 4 is a schematic block diagram illustrating one embodiment of a system for multi TRP multi PDCCH transmission.

FIG. 4 is a schematic block diagram illustrating one embodiment of a system 400 for multi TRP multi PDCCH transmission. The system 400 includes a first TRP 402 and a second TRP 404 that make concurrent (e.g., simultaneous, overlapping) transmissions to a UE 406. The first TRP 402 may include transmissions 408, such as PDCCH (e.g., PDCCH1), PDSCH (e.g., PDSCH1), and PUCCH (e.g., PUCCH1—such as for ACK/NACK). Furthermore, the second TRP 404 may include transmissions 410, such as PDCCH (e.g., PDCCH2), PDSCH (e.g., PDSCH2), and PUCCH (e.g., PUCCH2—such as for ACK/NACK).

In the embodiment illustrated in FIG. 4, the first and second TRPs 402, 404 scheduling their respective PDSCH transmission using their own PDCCH (e.g., DCI format 1_1), and the UE 406 provides the feedback (ACK/NACK) to the first and second TRPs 402, 404 through corresponding PUCCHs. With the exception of information exchange (e.g., such as RRC configuration) at slow time scale (e.g., subject to the delay of the non-ideal backhaul), the first and second TRPs 402, 404 may schedule their PDSCH transmissions independently. A slow time scale may refer to an effective time corresponding to an RRC configuration. For example, an RRC configuration may be effective from a time that it is received by a UE until a new configuration is received, so it may be considered a slow time scale because it is not changed with every TTI. Accordingly, if a gNB or a UE uses an RRC parameter for TX and/or RX, the gNB or the UE will use a current valid RRC parameter. As described herein, one TRP may derive the REs used by PTRS of a PDSCH transmitted by another TRP without detailed knowledge of the PDCCH of the other TRP.

In certain embodiments, there may be two types of PTRS for multi-TRP multi-PDCCH systems, a new NZP PTRS and a new ZP PTRS. The new ZP PTRS may include REs that a PDSCH does not use for data and that the other PDSCH transmitted by the other TRP may use for PTRS (e.g., without detailed knowledge of the scheduling information). For example, if PDSCH1 is transmitted by the first TRP 402, REs of the PDSCH1 corresponding to NZP PTRS may only be used for PTRS by the first TRP 402 (e.g., not for transmitting data), and REs corresponding to ZP PTRS are not used for PTRS or data. This structure may enable accurate estimation of the PTRS transmitted in these REs by the second TRP 404 in PDSCH2.

In certain embodiments, an NZP PTRS or ZP CSI-RS may be characterized by its frequency density (e.g., $K_{PT-RS}$) and subcarrier location (e.g., k) in a frequency domain, and time density and symbol location in a time domain. In some embodiments, the PTRS density (e.g., $K_{PT-RS}$) in the frequency domain of other configurations may be used (e.g., 1 PTRS in every 1, 2, or 4 PRBs depending on the scheduled BW). As may be appreciated, density in the frequency domain may be a function of the scheduled bandwidth, and the two PDSCHs (e.g., PDSCH1 and PDSCH2) may have the same number of RBs (therefore the same density in terms of PRBs). In various embodiments, for DL PTRS, the UE 406 may be configured with the following parameters via RRC signaling: $n_{NZP-PTRS}$ and $n_{ZP-PTRS}$ (e.g., via 16 bits each), and $k^{RE}_{ref-NZP}$ and $k^{RE}_{ref-ZP}$ (e.g., via somewhere in the range from 0 to 11, represented by 4 bits).

In some embodiments, $k^{RE}_{ref-NZP}$ may correspond to the same CDM group as the DMRS ports used in the PDSCH, and $k^{RE}_{ref-ZP}$ may correspond to a CDM group not used by the DMRSs port in the PDSCH. Accordingly, $k^{RE}_{ref-NZP} \neq k^{RE}_{ref-ZP}$.

In certain embodiments, the first TRP 402 and the second TRP 404 may be configured with the following conditions via RRC signaling: $k^{RE}_{ref-NZP}{}^1 = k^{RE}_{ref-ZP}{}^2$, $k^{RE}_{ref-NZP}{}^2 = k^{RE}_{ref-ZP}{}^1$, $n_{NZP-PTRS}{}^1 = n_{ZP-PTRS}{}^2$, and $n_{ZP-PTRS}{}^1 = n_{NZP-PTRS}{}^2$.

In various embodiments, $n_{NZP-PTRS}{}^i = n_{ZP-PTRS}{}^i$ for a TRP i. In such embodiments, superscript i may represent an RRC parameter configured for TRP i.

In some embodiments, a subcarrier location for NZP-PTRS may be given by:

$$k_{NZP} = k^{RE}_{ref-NZP} + (iK_{PT-RS} + k^{RB}_{ref-NZP})N^{RB}_{sc}$$

$$k^{RB}_{ref-NZP} = \begin{cases} n_{NZP-PTRS} \bmod K_{PT-RS} & \text{if } N_{RB} \bmod K_{PT-RS} = 0 \\ n_{NZP-PTRS} \bmod(N_{RB} \bmod K_{PT-RS}) & \text{otherwise} \end{cases},$$

where i=0, 1, 2, . . .

and the subcarrier location for ZP-PTRS may be given by:

$$k_{ZP} = k^{RE}_{ref-ZP} + (iK_{PT-RS} + k^{RB}_{ref-ZP})N^{RB}_{sc}$$

$$k^{RB}_{ref-ZP} = \begin{cases} n_{ZP-PTRS} \bmod K_{PT-RS} & \text{if } N_{RB} \bmod K_{PTRS} = 0 \\ n_{ZP-PTRS} \bmod(N_{RB} \bmod K_{PT-RS}) & \text{otherwise} \end{cases},$$

where i=0, 1, 2, . . .

In certain embodiments, in the time domain, OFDM symbols containing the NZP-PTRS may be the same as that of other configurations (e.g., depending on scheduled MCS). In various embodiments, OFDM symbols containing ZP-PTRS are all the OFDM symbols of the PDSCH except those used by DMRS. In some embodiments, for a PDSCH, its NZP-PTRS REs are used only to transmit its PTRS (e.g., not used to transmit data) and no data and no PTRS is transmitted in the ZP-PTRS REs. This may enable accurate estimation of PTRS of the other PDSCH transmitted by the other TRP at the UE 406 without interference. In certain embodiments, a reason that ZP-PTRS may occupy all the OFDM symbols may be because one TRP does not know the MCS used by the other TRP in the PDSCH. Thus, the TRP may assume the highest time domain density to not cause interference.

In one embodiment, the UE 406 is configured via RRC signaling with $n^1_{NZP-PTRS}$, $n^1_{ZP-PTRS}$, $k^{RE}_{ref-NZP}{}^1 = 0$, and $k^{RE}_{ref-ZP}{}^1 = 1$ for the first TRP 402, and $n^2_{NZP-PTRS}$, $n^2_{ZP-PTR}$, $k^{RE}_{ref-NZP}{}^2 = 1$, and $k^{RE}_{ref-ZP}{}^2 = 0$ for the second TRP 404. In such an embodiment, through coordination via the an interface between the first TRP 402 and the second TRP 404 related RRC parameters are exchanged (e.g., $n_{NZP-PTRS}$, $n_{ZP-PTRS}$, etc.); therefore, the first TRP 402 and the second TRP 404 may transmit their PDSCHs in the same resources and with the same DMRS configuration (although they do not always transmit via the same RE in these resources). In some embodiments, PDSCH1 transmitted by the first TRP 402 and PDSCH2 transmitted by second TRP 404 are both configured with DMRS configuration type 1. In certain embodiments, the first TRP 402 transmits PDSCH1 to the UE 406 using DMRS ports 0 and 1. In some embodiments, the second TRP 404 transmits PDSCH2 to the UE 406 using DMRS ports 2 and 3. In various embodiments, the first TRP 402 and the second TRP 404 may be in different DMRS CDM groups and occupy different sets of REs, but they may occupy the same OFDM symbols, thereby enabling channel estimation of DMRS transmitted from different TRPs.

In certain embodiments, $K_{PT-RS}=2$ for both PDSCH1 and PDSCH2 (since they occupy the same PRBs), and $k^{RB}_{ref-NZP}{}^1=0$, $k^{RB}_{ref-ZP}{}^1=1$, $k^{RB}_{ref-NZP}{}^2=0$, $k^{RB}_{ref-ZP}{}^2=1$.

In some embodiments, in PDSCH1, the first TRP 402 may transmit NZP-PTRS1 in the following subcarriers: $k^1_{NZP}=0+(2i+0)*12=24i$, where i=0, 1, 2 . . . and the first TRP 402 may reserve the REs for ZP-PTRS1 in the following subcarriers: $k^1_{ZP}=1+(2i+1)*12=13+24i$, wherein i=0, 1, 2 . . . .

In the time domain, NZP-PTRS1 may follows the same behavior as PTRS in other configurations (e.g., NR release 15). In various embodiments, for a configuration in which $L_{PT-RS}=2$ or 4, OFDM symbols unused by DMRS or NZP-PTRS1 may be used for data transmission. In such embodiments, all OFDM symbols in subcarrier $k^1_{ZP}$ (e.g., ZP-PTRS1) may not be used by PDSCH1.

Similarly, in various embodiments, in PDSCH2, the second TRP 404 may transmit NZP-PTRS2 in the following subcarriers: $k^2_{NZP}=1+(2i+1)*12=13+24i$, i=0, 1, 2 . . . and the second TRP 404 may reserve the REs for ZP-PTRS2 in the following subcarriers: $k^2_{ZP}=0\pm(2i+1)*12=24i$, i=0, 1, 2 . . . .

In the time domain, NZP-PTRS2 follows the same behavior as PTRS in other configurations (e.g., NR release 15). In certain embodiments, for a configuration in which $L_{PT-RS}=2$ or 4, OFDM symbols unused by DMRS2 or NZP-PTRS2 may be used for data transmission. In such embodiments, all OFDM symbols in subcarrier $k^2_{ZP}$ (e.g., ZP-PTRS2) may not be used by PDSCH2.

In various embodiments, the NZP-PTRS1 transmitted by the first TRP 402 may be treated as ZP-PTRS2 by the second TRP 404 so that there is no interference with the NZP-PTRS2 transmitted by the second TRP 404. In such embodiments, the NZP-PTRS2 transmitted by the second TRP 404 may be treated as ZP-PTRS1 by the first TRP 402 so that there is no interference with the NZP-PTRS1 transmitted by the first TRP 402. Moreover, in such embodiments, the first TRP 402 and the second TRP 404 may not need to share scheduling information such as $n_{RNTI}$ or MCS. Although in embodiments described herein two TRPs transmit to the UE 406 using the same resources, the absence of $n_{RNTI}$ in determining the REs used by NZP PTRS or ZP PTRS makes the scheme applicable if the TRPs are transmitting to different UEs.

Figure 5:
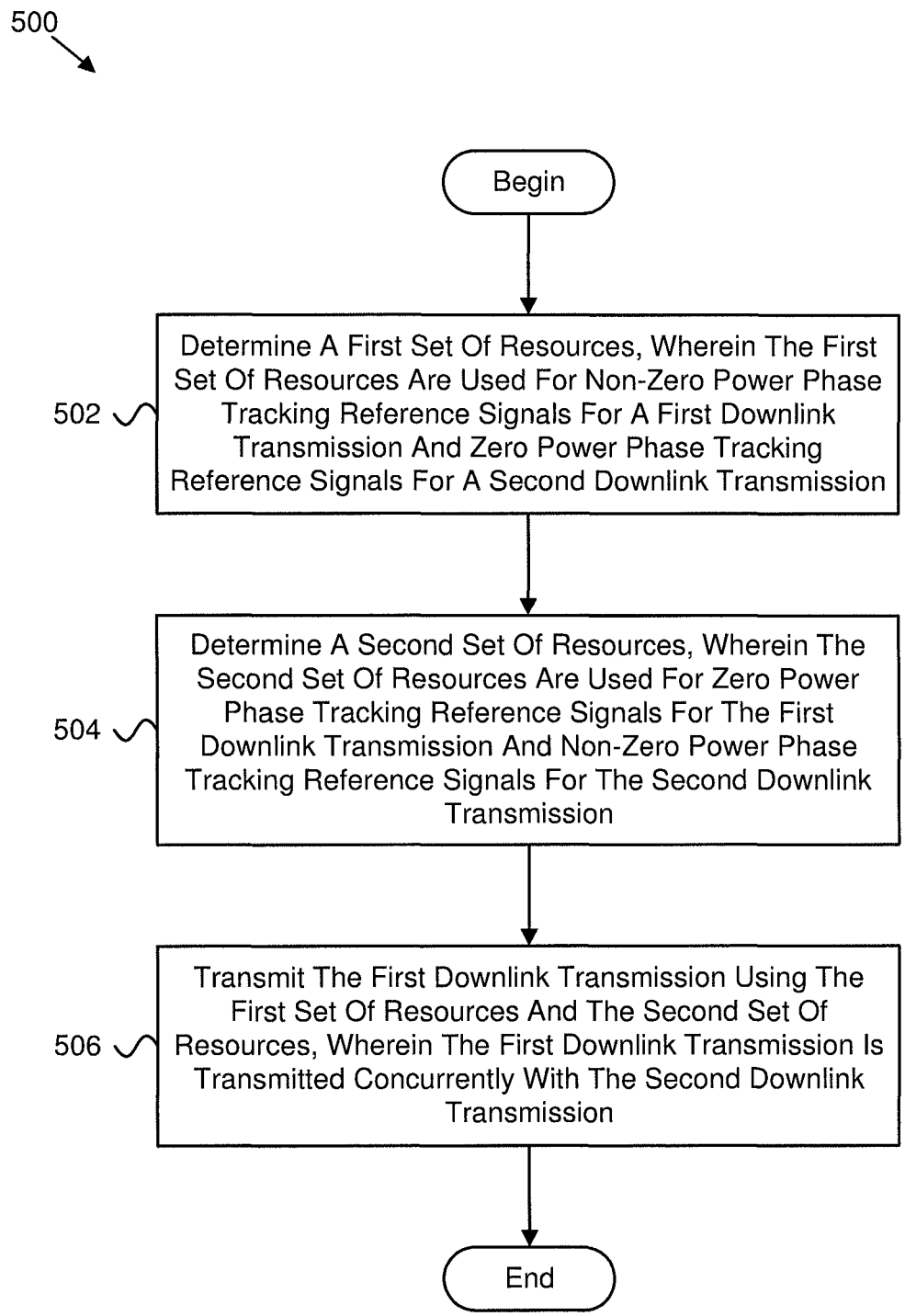
FIG. 5 is a schematic flow chart diagram illustrating one embodiment of a method for determining resources for phase tracking reference signals.

FIG. 5 is a schematic flow chart diagram illustrating one embodiment of a method 500 for determining resources for phase tracking reference signals. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a first set of resources. In such an embodiment, the first set of resources are used for non-zero power phase tracking reference signals for a first downlink transmission and zero power phase tracking reference signals for a second downlink transmission. In certain embodiments, the method 500 includes determining 504 a second set of resources. In such embodiments, the second set of resources are used for zero power phase tracking reference signals for the first downlink transmission and non-zero power phase tracking reference signals for the second downlink transmission. In various embodiments, the method 500 includes transmitting 506 the first downlink transmission using the first set of resources and the second set of resources. In such embodiments, the first downlink transmission is transmitted concurrently with the second downlink transmission.

In certain embodiments, the method 500 comprises transmitting the second downlink transmission using the first set of resources and the second set of resources. In some embodiments, the first downlink transmission and the second downlink transmission are transmitted via physical downlink shared channels. In various embodiments, the first set of resources and the second set of resources are determined based on one or more parameters.

In one embodiment, the one or more parameters are configured via radio resource control signaling. In certain embodiments, the one or more parameters comprise $n_{NZP-PTRS}$, $n_{ZP-PTRS}$, $k^{RE}_{ref-NZP}$, and $k^{RE}_{ref-ZP}$. In some embodiments, $n_{NZP-PTRS}$ and $n_{ZP-PTRS}$ are different. In various embodiments, $n_{NZP-PTRS}$ and $n_{ZP-PTRS}$ are the same.

In one embodiment, subcarriers corresponding to the zero power phase tracking reference signals do not carry phase tracking reference signals or data for physical downlink shared channel transmissions. In certain embodiments, subcarriers corresponding to the non-zero power phase tracking reference signals are configured to carry phase tracking reference signals or data for physical downlink shared channel transmissions. In some embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

Figure 6:
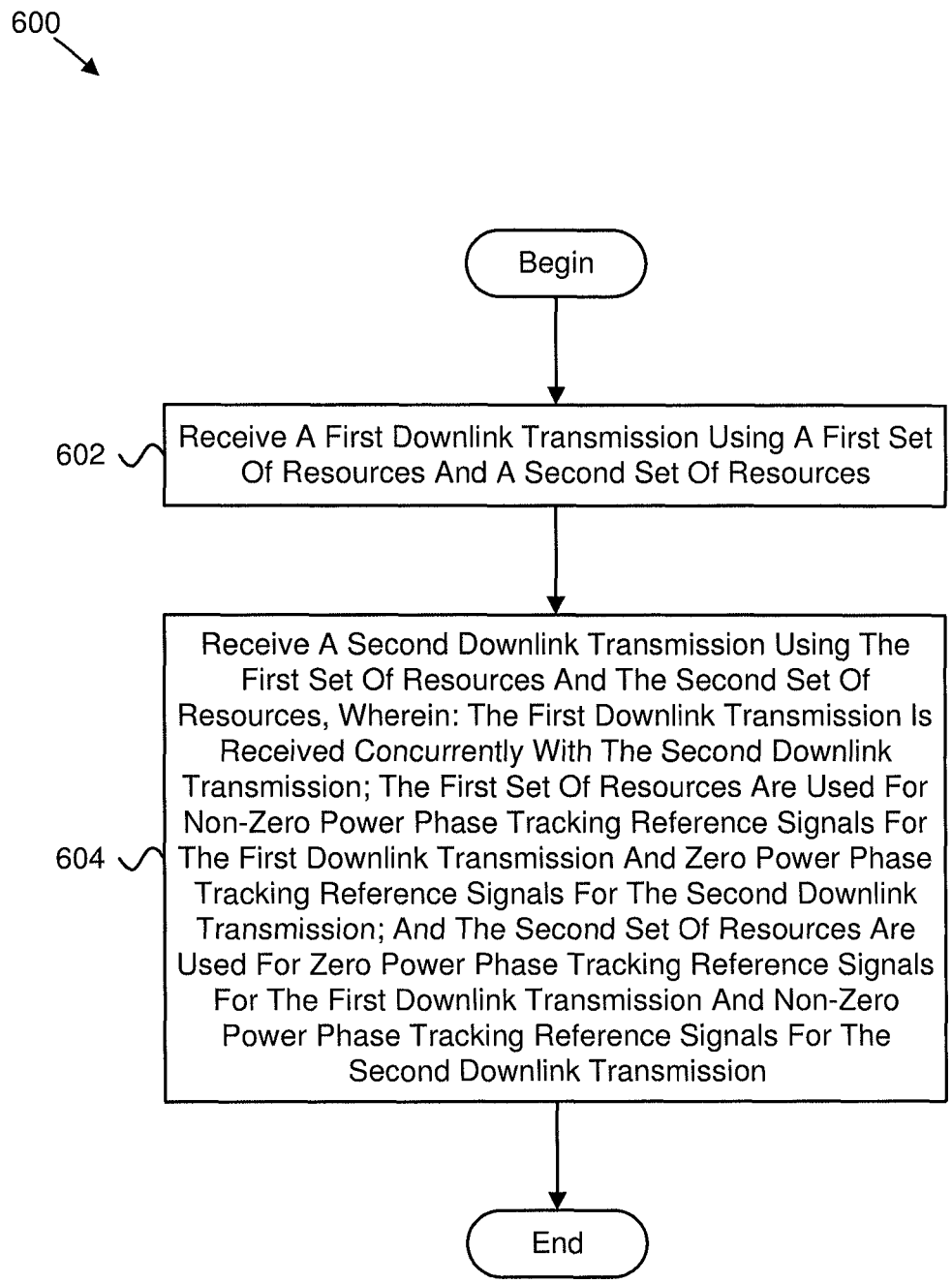
FIG. 6 is a schematic flow chart diagram illustrating another embodiment of a method for determining resources for phase tracking reference signals.

FIG. 6 is a schematic flow chart diagram illustrating another embodiment of a method 600 for determining resources for phase tracking reference signals. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a first downlink transmission using a first set of resources and a second set of resources. In certain embodiments, the method 600 includes receiving 604 a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

In certain embodiments, the first downlink transmission and the second downlink transmission are received via physical downlink shared channels. In some embodiments, the first set of resources and the second set of resources are determined based on one or more parameters. In various embodiments, the one or more parameters are configured via radio resource control signaling.

In one embodiment, the one or more parameters comprise $n_{NZP-PTRS}$, $n_{ZP-PTRS}$, $k^{RE}_{ref-NZP}$, and $k^{RE}_{ref-ZP}$. In certain embodiments, $n_{NZP-PTRS}$ and $n_{ZP-PTRS}$ are different. In some embodiments, $n_{NZP-PTRS}$ and $n_{ZP-PTRS}$ are the same.

In various embodiments, subcarriers corresponding to the zero power phase tracking reference signals do not carry phase tracking reference signals or data for physical downlink shared channel transmissions. In one embodiment, subcarriers corresponding to the non-zero power phase tracking reference signals are configured to carry phase tracking reference signals or data for physical downlink shared channel transmissions. In certain embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

In one embodiment, a method comprises: determining a first set of resources, wherein the first set of resources are used for non-zero power phase tracking reference signals for a first downlink transmission and zero power phase tracking reference signals for a second downlink transmission; determining a second set of resources, wherein the second set of resources are used for zero power phase tracking reference signals for the first downlink transmission and non-zero power phase tracking reference signals for the second downlink transmission; and transmitting the first downlink transmission using the first set of resources and the second set of resources, wherein the first downlink transmission is transmitted concurrently with the second downlink transmission.

In certain embodiments, the method comprises transmitting the second downlink transmission using the first set of resources and the second set of resources.

In some embodiments, the first downlink transmission and the second downlink transmission are transmitted via physical downlink shared channels.

In various embodiments, the first set of resources and the second set of resources are determined based on one or more parameters.

In one embodiment, the one or more parameters are configured via radio resource control signaling.

In certain embodiments, the one or more parameters comprise $n_{NZP-PTRS}$, $n_{ZP-PTRS}$, $k^{RE}_{ref-NZP}$, and $k^{RE}_{ref-ZP}$.

In some embodiments, $n_{NZP-PTRS}$ and $n_{ZP-PTRS}$ are different.

In various embodiments, $n_{NZP-PTRS}$ and $n_{ZP-PTRS}$ are the same.

In one embodiment, subcarriers corresponding to the zero power phase tracking reference signals do not carry phase tracking reference signals or data for physical downlink shared channel transmissions.

In certain embodiments, subcarriers corresponding to the non-zero power phase tracking reference signals are configured to carry phase tracking reference signals or data for physical downlink shared channel transmissions.

In some embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

In one embodiment, an apparatus comprises: a processor that: determines a first set of resources, wherein the first set of resources are used for non-zero power phase tracking reference signals for a first downlink transmission and zero power phase tracking reference signals for a second downlink transmission; and determines a second set of resources, wherein the second set of resources are used for zero power phase tracking reference signals for the first downlink transmission and non-zero power phase tracking reference signals for the second downlink transmission; and a transmitter that transmits the first downlink transmission using the first set of resources and the second set of resources, wherein the first downlink transmission is transmitted concurrently with the second downlink transmission.

In certain embodiments, the transmitter transmits the second downlink transmission using the first set of resources and the second set of resources.

In some embodiments, the first downlink transmission and the second downlink transmission are transmitted via physical downlink shared channels.

In various embodiments, the first set of resources and the second set of resources are determined based on one or more parameters.

In one embodiment, the one or more parameters are configured via radio resource control signaling.

In certain embodiments, the one or more parameters comprise $n_{NZP\text{-}PTRS}$, $n_{ZP\text{-}PTRS}$, $k^{RE}_{ref\text{-}NZP}$, and $k^{RE}_{ref\text{-}ZP}$.

In some embodiments, $n_{NZP\text{-}PTRS}$ and $n_{ZP\text{-}PTRS}$ are different.

In various embodiments, $n_{NZP\text{-}PTRS}$ and $n_{ZP\text{-}PTRS}$ are the same.

In one embodiment, subcarriers corresponding to the zero power phase tracking reference signals do not carry phase tracking reference signals or data for physical downlink shared channel transmissions.

In certain embodiments, subcarriers corresponding to the non-zero power phase tracking reference signals are configured to carry phase tracking reference signals or data for physical downlink shared channel transmissions.

In some embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

In one embodiment, a method comprises: receiving a first downlink transmission using a first set of resources and a second set of resources; and receiving a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

In certain embodiments, the first downlink transmission and the second downlink transmission are received via physical downlink shared channels.

In some embodiments, the first set of resources and the second set of resources are determined based on one or more parameters.

In various embodiments, the one or more parameters are configured via radio resource control signaling.

In one embodiment, the one or more parameters comprise $n_{NZP\text{-}PTRS}$, $n_{ZP\text{-}PTRS}$, $k^{RE}_{ref\text{-}NZP}$, and $k^{RE}_{ref\text{-}ZP}$.

In certain embodiments, $n_{NZP\text{-}PTRS}$ and $n_{ZP\text{-}PTRS}$ are different.

In some embodiments, $n_{NZP\text{-}PTRS}$ and $n_{ZP\text{-}PTRS}$ are the same.

In various embodiments, subcarriers corresponding to the zero power phase tracking reference signals do not carry phase tracking reference signals or data for physical downlink shared channel transmissions.

In one embodiment, subcarriers corresponding to the non-zero power phase tracking reference signals are configured to carry phase tracking reference signals or data for physical downlink shared channel transmissions.

In certain embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

In one embodiment, an apparatus comprises: a receiver that: receives a first downlink transmission using a first set of resources and a second set of resources; and receives a second downlink transmission using the first set of resources and the second set of resources, wherein: the first downlink transmission is received concurrently with the second downlink transmission; the first set of resources are used for non-zero power phase tracking reference signals for the first downlink transmission and zero power phase tracking reference signals for the second downlink transmission; and the second set of resources are used for zero power phase tracking reference signals for the first downlink transmission and non-zero power phase tracking reference signals for the second downlink transmission.

In certain embodiments, the first downlink transmission and the second downlink transmission are received via physical downlink shared channels.

In some embodiments, the first set of resources and the second set of resources are determined based on one or more parameters.

In various embodiments, the one or more parameters are configured via radio resource control signaling.

In one embodiment, the one or more parameters comprise $n_{NZP\text{-}PTRS}$, $n_{ZP\text{-}PTRS}$, $k^{RE}_{ref\text{-}NZP}$, and $k^{RE}_{ref\text{-}ZP}$.

In certain embodiments, $n_{NZP\text{-}PTRS}$ and $n_{ZP\text{-}PTRS}$ are different.

In some embodiments, $n_{NZP\text{-}PTRS}$ and $n_{ZP\text{-}PTRS}$ are the same.

In various embodiments, subcarriers corresponding to the zero power phase tracking reference signals do not carry phase tracking reference signals or data for physical downlink shared channel transmissions.

In one embodiment, subcarriers corresponding to the non-zero power phase tracking reference signals are configured to carry phase tracking reference signals or data for physical downlink shared channel transmissions.

In certain embodiments, each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
   determining a first set of resources, wherein the first set of resources are used for non-zero power (NZP) phase tracking reference signals (PTRS) (NZP-PTRSs) for a first downlink transmission and zero power (ZP) PTRS (ZP-PTRSs) for a second downlink transmission;
   determining a second set of resources, wherein the second set of resources are used for ZP-PTRSs for the first downlink transmission and NZP-PTRSs for the second downlink transmission; and
   transmitting, to a user equipment (UE), the first downlink transmission using the first set of resources and the second set of resources, wherein the first downlink transmission is transmitted concurrently with the second downlink transmission.

2. The method of claim 1, further comprising transmitting the second downlink transmission using the first set of resources and the second set of resources.

3. The method of claim 1, wherein the first downlink transmission and the second downlink transmission are transmitted via physical downlink shared channels.

4. The method of claim 1, wherein the first set of resources and the second set of resources are determined based on one or more parameters.

5. The method of claim 4, wherein the one or more parameters are configured via radio resource control signaling.

6. The method of claim 4, wherein the one or more parameters comprise $n_{NZP\text{-}PTRS}$, $n_{ZP\text{-}PTRS}$, $k^{RE}_{ref\text{-}NZP}$, and $k^{RE}_{ref\text{-}ZP}$.

7. The method of claim 6, wherein $n_{NZP\text{-}PTRS}$ and $n_{ZP\text{-}PTRS}$ are different.

8. The method of claim 6, wherein $n_{NZP\text{-}PTRS}$ and $n_{ZP\text{-}PTRS}$ are the same.

9. The method of claim 1, wherein subcarriers corresponding to the zero power phase tracking reference signals do not carry phase tracking reference signals or data for physical downlink shared channel transmissions.

10. The method of claim 1, wherein subcarriers corresponding to the non-zero power phase tracking reference signals are configured to carry phase tracking reference signals or data for physical downlink shared channel transmissions.

11. The method of claim 10, wherein each of the subcarriers corresponding to the non-zero power phase tracking reference signals carry data for a corresponding physical downlink shared channel transmission if the respective subcarrier does not carry phase tracking reference signals for the corresponding physical downlink shared channel transmission.

12. A base station, comprising:
at least one memory; and
at least one processor coupled with the at least one memory and configured to cause the base station to:
determine a first set of resources, wherein the first set of resources are used for non-zero power (NZP) phase tracking reference signals (PTRS) (NZP-PTRSs) for a first downlink transmission and zero power (ZP) PTRS (ZP-PTRSs) for a second downlink transmission;
determine a second set of resources, wherein the second set of resources are used for ZP-PTRSs for the first downlink transmission and NZP-PTRSs for the second downlink transmission; and
transmit, to a user equipment (UE), the first downlink transmission using the first set of resources and the second set of resources, wherein the first downlink transmission is transmitted concurrently with the second downlink transmission.

13. A method performed by a user equipment (UE), the method comprising:
receiving a first downlink transmission using a first set of resources and a second set of resources; and
receiving a second downlink transmission using the first set of resources and the second set of resources, wherein:
the first downlink transmission is received concurrently with the second downlink transmission;
the first set of resources are used for non-zero power (NZP) phase tracking reference signals (PTRS) (NZP-PTRSs) for the first downlink transmission and zero power (ZP) PTRS (ZP-PTRSs) for the second downlink transmission; and
the second set of resources are used for ZP-PTRSs for the first downlink transmission and NZP-PTRSs for the second downlink transmission.

14. The method of claim 13, wherein the first downlink transmission and the second downlink transmission are received via physical downlink shared channels.

15. The method of claim 13, wherein the first set of resources and the second set of resources are determined based on one or more parameters.

16. The method of claim 15, wherein the one or more parameters are configured via radio resource control signaling.

17. The method of claim 15, wherein the one or more parameters comprise $n_{NZP\text{-}PTRS}$, $n_{ZP\text{-}PTRS}$, $k^{RE}_{ref\text{-}NZP}$, and $k^{RE}_{ref\text{-}ZP}$.

18. The method of claim 13, wherein subcarriers corresponding to the zero power phase tracking reference signals do not carry phase tracking reference signals or data for physical downlink shared channel transmissions.

19. The method of claim 13, wherein subcarriers corresponding to the non-zero power phase tracking reference signals are configured to carry phase tracking reference signals or data for physical downlink shared channel transmissions.

20. A user equipment (UE), comprising:
at least one memory; and
at least one processor coupled with the at least one memory and configured to cause the UE to:
receive a first downlink transmission using a first set of resources and a second set of resources; and
receive a second downlink transmission using the first set of resources and the second set of resources, wherein:
the first downlink transmission is received concurrently with the second downlink transmission;
the first set of resources are used for non-zero power (NZP) phase tracking reference signals (PTRS) (NZP-PTRSs) for the first downlink transmission and zero power (ZP) PTRS (ZP-PTRSs) for the second downlink transmission; and
the second set of resources are used for ZP-PTRSs for the first downlink transmission and NZP-PTRSs for the second downlink transmission.

* * * * *